C. L. RUSSELL.
VEHICLE WHEEL.
APPLICATION FILED JULY 24, 1913.
1,086,333.
Patented Feb. 3, 1914.
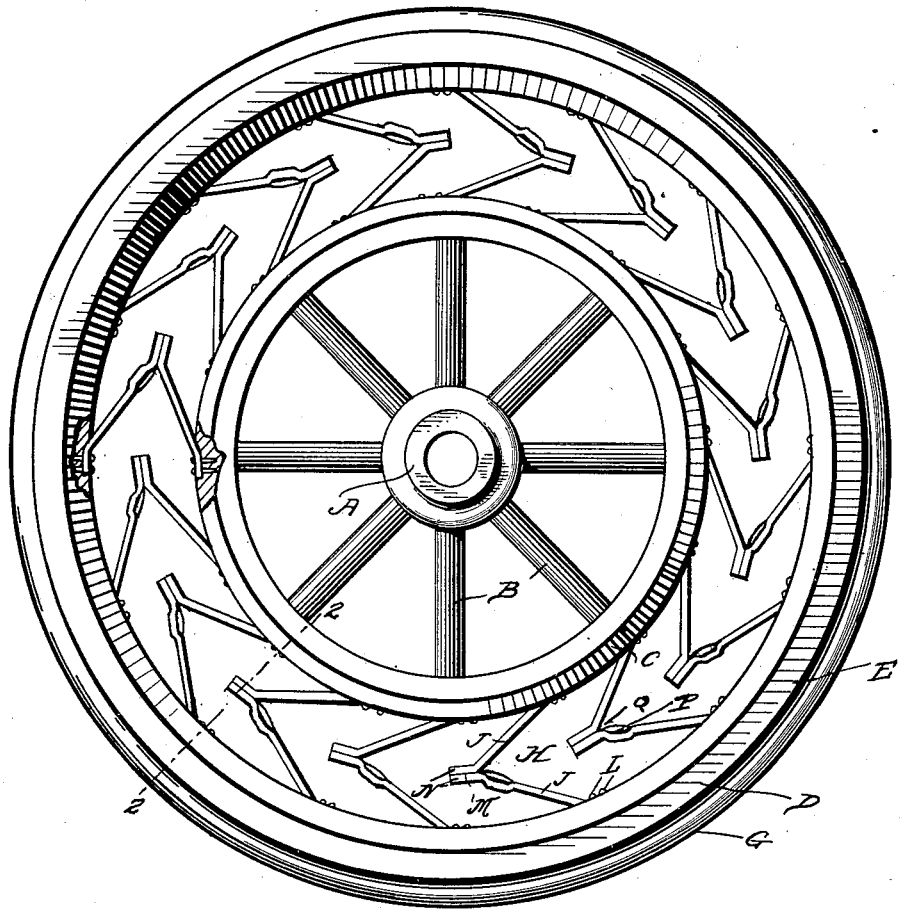
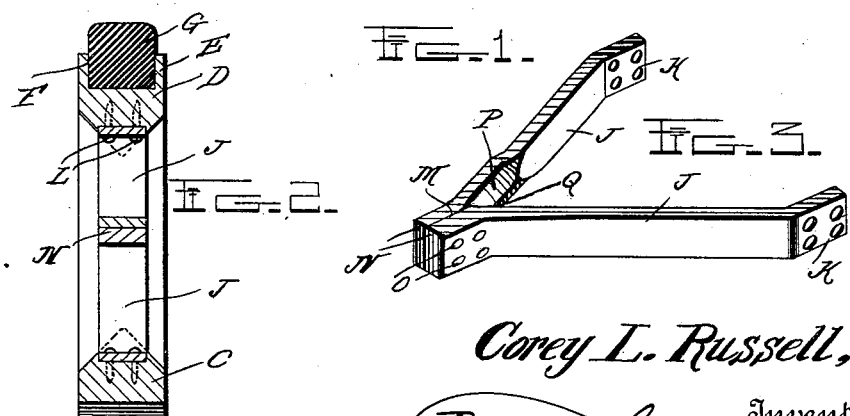
Corey L. Russell,
Inventor

UNITED STATES PATENT OFFICE.

COREY L. RUSSELL, OF REXBURG, IDAHO, ASSIGNOR OF ONE-FOURTH TO GEORGE R. LARSEN, OF REXBURG, IDAHO.

VEHICLE-WHEEL.

1,086,333.  Specification of Letters Patent.  Patented Feb. 3, 1914.

Application filed July 24, 1913. Serial No. 780,876.

*To all whom it may concern:*

Be it known that I, COREY L. RUSSELL, a citizen of the United States, residing at Rexburg, in the county of Fremont and State of Idaho, have invented certain new and useful Improvements in Vehicle-Wheels, of which the following is a specification.

My invention relates to improvements in vehicle wheels, and refers particularly to what are known as spring or resilient wheels, and the objects of my invention are the provision of a wheel of this character which will properly receive and distribute the spring action to the entire wheel; which will perform all the functions of a pneumatic tired wheel and have a much longer life; which can be used upon light or heavy vehicles, and prove entirely efficient; which will be of inexpensive construction all things considered and which will prove entirely practical in every particular.

With these objects in view my invention consists of a spring wheel embodying novel features of construction and combination of parts substantially as disclosed herein.

Figure 1 is a side elevation of a spring wheel constructed in accordance with and embodying my invention. Fig. 2 is a sectional view on line 2—2 of Fig. 1, and Fig. 3 is a perspective view on an enlarged scale of one of the novel spring members used in the construction of my wheel.

In the drawings: the letter A designates the hub, B the spokes, C the felly, and D the surrounding rim of the inner wheel of my invention, which is surrounded by the flanges E forming a channel F, in which is received the solid elastic tire G, this forming the outer wheel of the structure and being arranged concentric with the inner wheel to provide the surrounding space H. In the surrounding space are disposed the spring or cushion members which I employ in my wheel, and which as clearly shown in Fig. 3, consists of the two inclined arms J, having at each flaring end an attaching ear K, which receives suitable fastenings L, for securing the spring to the inner and outer wheel sections, and which at their apex M, are formed with flat lugs N, having their opposing faces fitting snugly together and secured in such position by suitable fastenings O. The upper arm J is provided on its inner face with the sunken portion forming the beveled edge P, which when the springs are collapsed or depressed acts after the manner of a cutter to dislodge any dirt or foreign matter from the inner crotch Q.

From the description and the drawings it will be observed that I provide an inner section and a surrounding section providing a space and that in said space is disposed the series of spring members which overlap and fit one within the other, and that the spring members are of the general shape of a V or acute angle, and that when the tread surface rides over the ground the springs receive the weight placed upon the wheel and yield under such weight in a uniform manner, and that should any dirt or foreign matter enter the space between the wheel and the rim section the beveled portion of the spring members will operate to instantly cut away and remove any dirt or foreign substance, thus preserving the spring members, keeping the wheel clean and allowing the springs to perform their functions in a perfect manner.

It is evident that I provide a spring wheel which will be capable of use upon light or heavy vehicle wheels; which will perform every function of a pneumatic wheel and prove cheaper by reason of its lasting qualities; which will permit of the application and removal of the spring members with ease when found necessary; and which will prove thoroughly efficient for the purpose intended.

I claim:

1. The spring wheel herein described, consisting of the inner wheel section, the outer section carrying the tire, and the angle shape spring members arranged in the space between said wheel and outer section and having their flaring ends secured to said sections and having their other ends connected and provided with means for removing accumulations upon the section and springs, said means consisting of a beveled portion at the outer side of the spring members adapted to engage the surface on the inner side of the spring members.

2. The herein described spring wheel consisting of the wheel section and the surrounding section carrying the tire and forming a space between said sections, a series of angle shaped spring members secured to said sections and having their other ends connected and arranged to cause said spring members to overlap, one section of each spring member having a beveled portion adapted to remove any foreign matter from the closed end of said spring members.

In tesimony whereof I affix my signature in presence of two witnesses.

COREY L. RUSSELL.

Witnesses:
SIDNEY D. ALDER,
THOMAS H. REYNOLDS.

Copies of this patent may be obtained for five cents each, by addressing the "Commissioner of Patents, Washington, D. C."